United States Patent [19]
Dimmock et al.

[11] 4,184,586
[45] Jan. 22, 1980

[54] ARTICLE TRANSLATION APPARATUS

[75] Inventors: Eric P. Dimmock, Parramatta; Leslie P. Spurrier, Berala, both of Australia

[73] Assignee: Concrete Industries (Monier) Limited, New South Wales, Australia

[21] Appl. No.: 930,646

[22] Filed: Aug. 3, 1978

[30] Foreign Application Priority Data

Aug. 18, 1977 [AU] Australia .............................. PD1298

[51] Int. Cl.² .............................................. B65G 19/26
[52] U.S. Cl. .................................... 198/726; 198/732; 198/795; 425/452
[58] Field of Search .............. 198/472, 726, 728, 732, 198/795; 425/253, 254, 452, DIG. 118

[56] References Cited

U.S. PATENT DOCUMENTS 3,674,402  7/1972  Schade .......................... 425/452 X
3,677,686  7/1972  Powel ............................ 198/732 X

FOREIGN PATENT DOCUMENTS 2646755  4/1977  Fed. Rep. of Germany ........... 198/795
1251705  10/1971  United Kingdom ..................... 425/452

*Primary Examiner*—Jeffrey V. Nase

*Attorney, Agent, or Firm*—Stevens, Davis, Miller & Mosher

[57] ABSTRACT

An article translation apparatus is described for moving a series of substantially identical articles contiguously supplied to it, each of the articles having a rearwardly directed abutment face. The apparatus comprises at least one endless conveyor loop having a series of article driving dogs equally spaced therearound, each dog having a downwardly extending driving spur adapted drivingly to engage the abutment face of an article and further including a slot at its leading end, each dog being rotatably mounted at its trailing end to the conveyor loop, the loop having equally spaced stop means extending into each slot to set upper and lower limits to the permitted rotation of each dog. The conveyor loop is power driven and positioned above the articles with a lower flight substantially parallel with the direction of travel of the articles, the pitch of adjacent pairs of the dogs along the lower flight being slightly less than the pitch of the successive abutment faces such that as each lagging dog descends into a substantially horizontal position of driving engagement with the abutment face of one article, defined by said lower limit of rotation, the abutment face of the adjacent leading article is moved out of driving engagement with the adjacent leading dog.

9 Claims, 5 Drawing Figures

ARTICLE TRANSLATION APPARATUS

In the manufacture of articles such as concrete tiles, it is necessary to move a number of relatively heavy pallets through various stages of the production process. These pallets are generally arranged contiguously edge to edge in a longitudinal series array with their major surfaces horizontally disposed such that a longitudinally directed driving force applied to one pallet can be used to push the leading pallets through a downstream production process.

It has previously been know to apply this driving force to the pallets from beneath but this system has been subject to several disadvantages. In the first place, the shape and strength of the pallets is generally unsuitable for the application of substantial, horizontally directed force from beneath, while the location of the drive mechanism beneath the pallets subjects the mechanism to considerable contamination by dirt or other matter falling into it from the pallets moving above.

It is an object of the present invention to provide an article translation apparatus capable of applying the required translational force to a series of articles in a continuous manner from a location above the article stream.

According to the invention there is provided an article translation apparatus for moving a series of substantially identical articles contiguously supplied thereto, each having a rearwardly directed abutment face thereon, said apparatus comprising at least one endless conveyor loop having a series of article driving dogs equally spaced therearound, each dog having a downwardly extending driving spur adapted drivingly to engage said abutment face and further including a slot at its leading end, each dog being rotatably mounted at its trailing end to said conveyor loop, said loop having equally spaced stop means extending into each slot to set upper and lower limits to the permitted rotation of each dog, means for driving said conveyor loop, said loop being positioned above said articles with a lower flight substantially parallel with the direction of travel of said articles, the pitch of adjacent pairs of said dogs along said lower flight being slightly less than the pitch of said abutment faces such that as each lagging dog descends into a substantially horizontal position of driving engagement with the abutment face of one article, defined by said lower limit of rotation, the abutment face of the adjacent leading article is moved out of driving engagement with the adjacent leading dog.

A preferred embodiment of the invention as applied to the driving of concrete tile pallets will now be described, by way of example only, with reference to the accompanying drawings in which.

Figure 1:
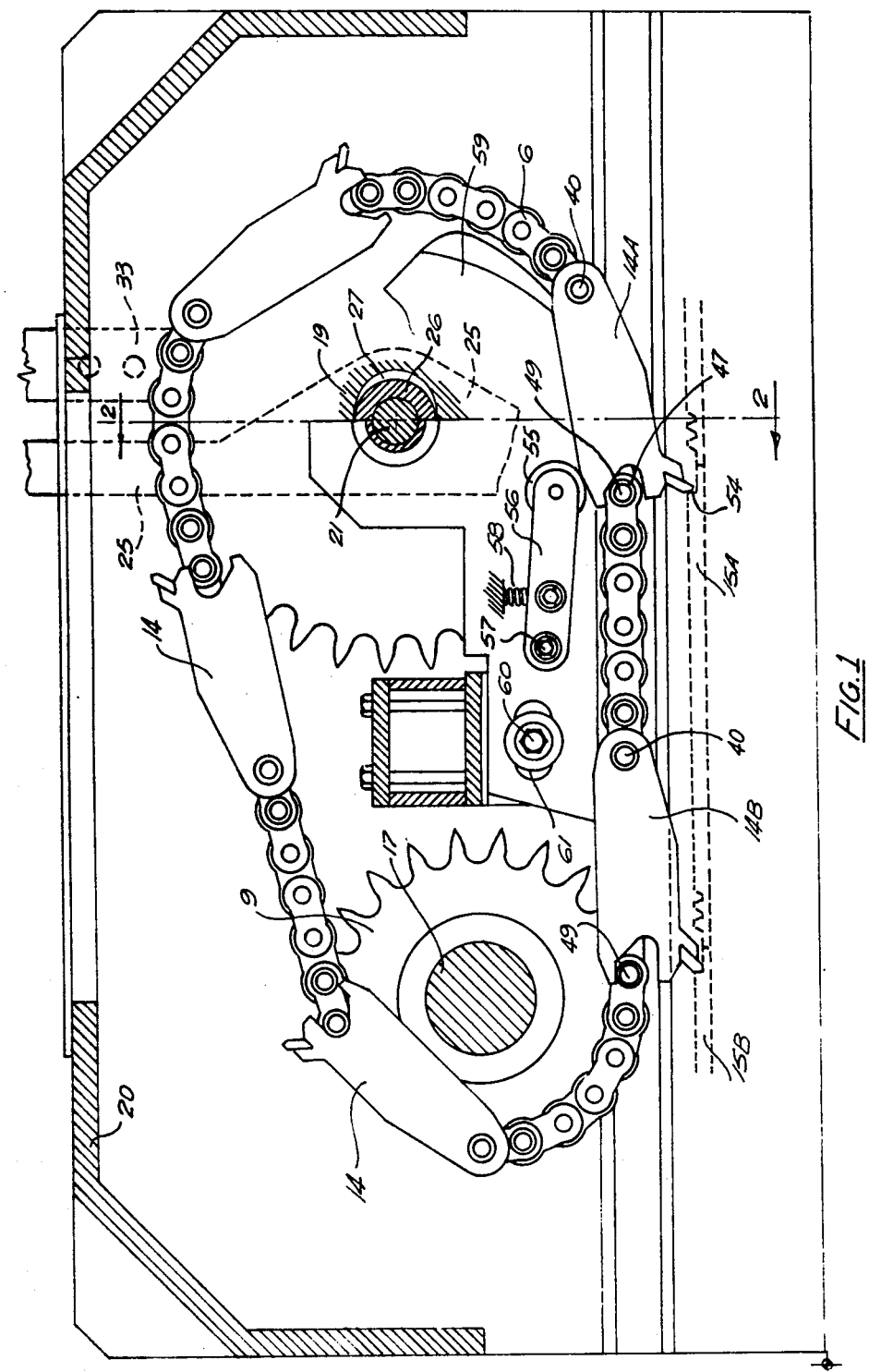
FIG. 1 is a sectional side elevation showing part of a pallet drive apparatus according to the invention.
Figure 2:
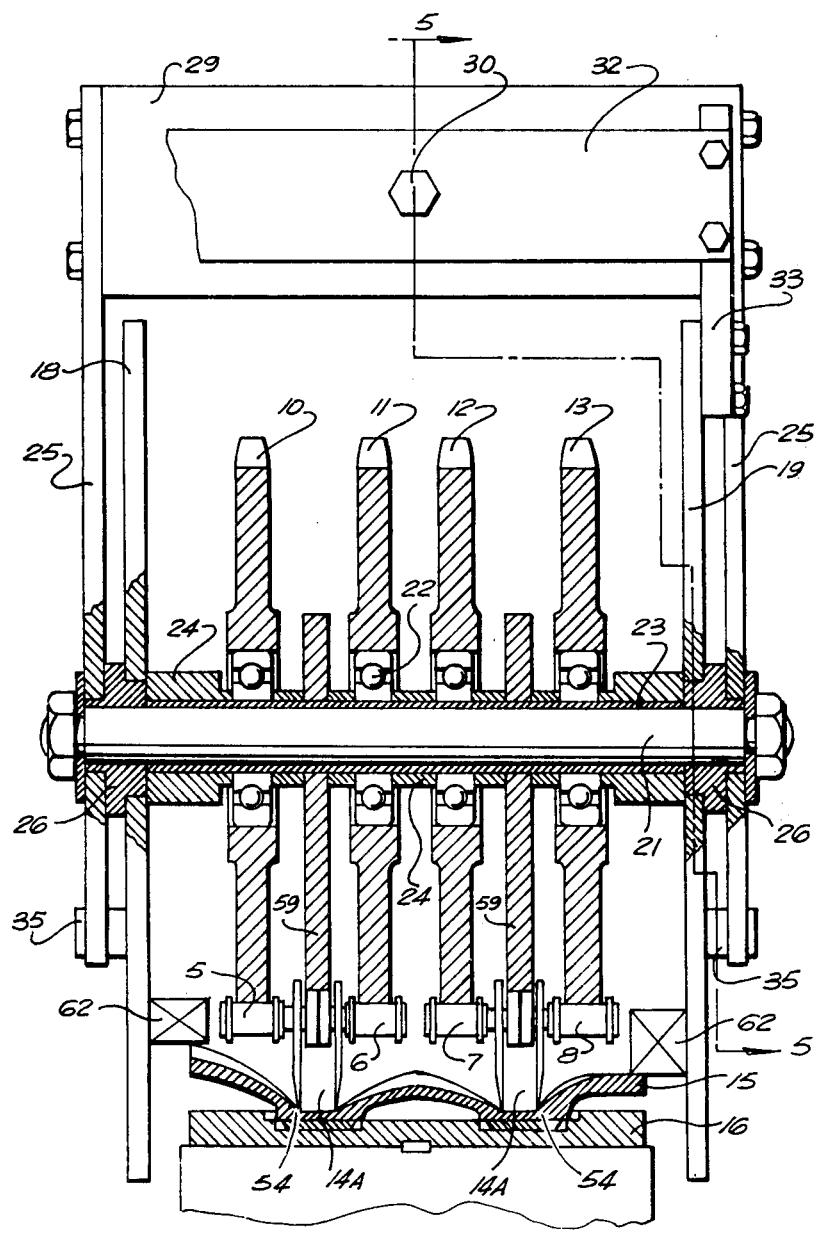
FIG. 2 is a section taken on line 2—2 of FIG. 1 on an enlarged scale, showing further detail of the apparatus.

Referring to the drawings, the translation apparatus of this embodiment includes four continuous chain loops 5, 6, 7, 8 arranged in two spaced pairs engaging a series of four drive sprockets 9 and a corresponding series of idler sprockets 10, 11, 12 and 13. Each pair of chain loops in identical and mounts between its two chains a series of five spaced pallet driving dogs 14 which, when the chains are driven in a clockwise sense when viewed in FIG. 1, successively engage the tile pallets 15 and move them to the left along a bed 16 as will be described in greater detail hereinafter. In one alternative embodiment the dogs may each be supported by a single chain rather than the double chain arrangement described.

Turning now to the chain support system, the four drive sprockets 9 are mounted for conjoined rotation on a drive shaft 17 journalled in opposite side walls 18 and 19 of a housing 20. Power is applied to the drive shaft by means of a sprocket (not shown) located on a portion of the drive shaft 17 projecting from the side wall 19.

The idler sprockets 10 to 13 inclusive are mounted to a fixed idler shaft 21 by bearings 22, the bearings 22 being positioned on a mounting sleeve 23 and spaced apart by spacing sleeves 24. The idler shaft 21 is locked into fixed engagement with tensioning levers 25 located outside the housing side walls. Each end of the shaft 21 is provided with a1collar 26 which extends through a slotted hole 27 in each side wall 18 and 19. This arrangement permits the shaft 21 to move relative to the housing under the influence of a tensioning spring 28 which acts upon a transverse beam 29 connected to the tensioning levers 25. The spring 28 is connected to the housing 20 by a central bolt 30 extending from a support beam 32 attached by mounting plates 33 to the housing side walls 18 and 19. As the idler shaft moves translationally in the slotted holes 27, the lower edge of each tensioning lever 25 in turn bears and slides against a pin 35 extending from each side wall.

Moving on to consider the driving dogs 14 and their mounting arrangement in greater detail, it can be seen that each dog 14 comprises two side plates 37 connected together by a web portion 38. Each dog is rotatably mounted to a bearing sleeve 39 supported by a connecting pin 40 extending between a pair of chain loops 5 and 6. The correct axial spacing of the components is maintained by symmetrical pairs of spacing washers 41, 42 and 43 as shown. Mounted on the same bearing sleeve 39 between the dog side plates 37 is a pair of bearings 45 the function of which will be explained later.

Figure 3:
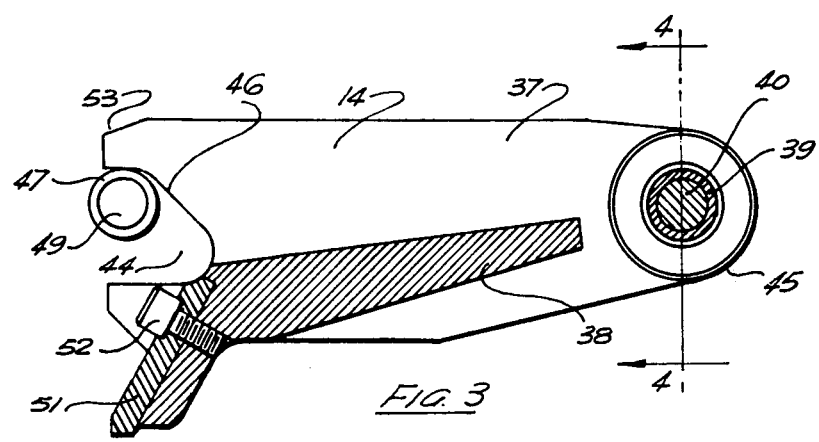
FIG. 3 is a sectional side elevation on an enlarged scale of a pallet driving dog shown in FIG. 1.
Figure 4:
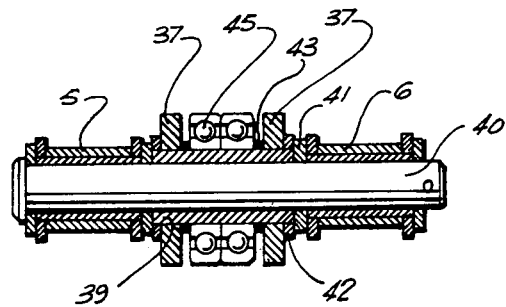
FIG. 4 is a section taken on line 4—4 of FIG. 3.
Figure 5:
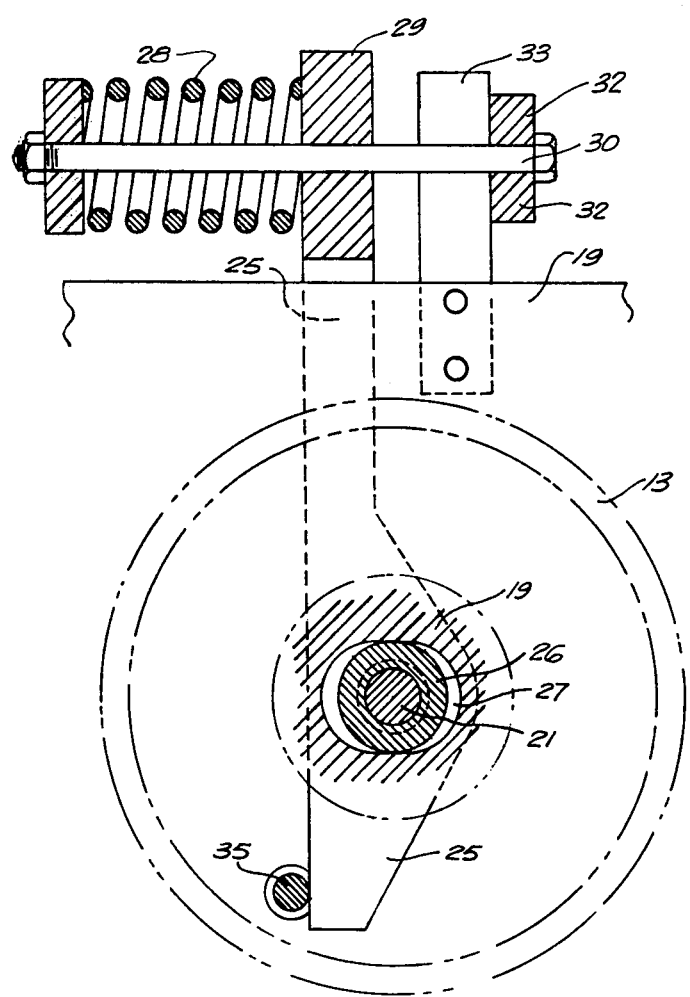
FIG. 5 is a section taken on line 5—5 of FIG. 2.

As best shown in FIG. 3, the leading end of each dog side plate is provided with a slot 44 having a partially inclined bearing surface 46 which bears against a stop in the form of a sleeve 47 mounted on a further connecting pin 49 which spans the two chain loops 5 and 6 in the same manner as pin 40. In this respect, the sleeve 47 corresponds with the bearing sleeve 39 of pin 40. The lower part of the leading end of each dog is provided with a hardened tip or spur 51 which is replaceable by removing a fixing screw 52, while the upper surface of the leading end is provided with an inclined camming face 53.

In operation, a series of substantially identical pallets are contiguously supplied to the pallet drive apparatus in the direction illustrated by a standard conveyor (not shown) which moves at a higher linear velocity than that of the pallet drive chains and therefore slips beneath the pallets 15. As a pallet 15A moves beneath the apparatus from the right as shown in FIG. 1, a pair of laterally spaced stepped portions 54 on the pallet are engaged by the spur 51 of a corresponding pair of spaced dogs 14A. It will be observed that the leading pallet 15B is being driven by a substantial force applied by the leading pair of dogs 14B.

In order to obtain a relatively smooth continuity of drive, the longitudinal pitch of the pins 40 is slightly less than that of the pallets, the two pitches being 16½" and 16¾" respectively in the present embodiment. The leading end of each dog is free to move slightly relative to the pin 49 within the upper and lower limits imposed by the slot 44. This slot limits the amount of rotational movement available to the dog and also the amount of inward movement as each dog traverses the chain path. Accordingly, as each dog approaches and moves past the position occupied by dog 14A in FIG. 1, the linear spacing between the spurs 51 of dogs 14A and 14B progressively reduces and the drive to the pallet stream is taken up by dog 14A which thereby moves pellet 15B ahead of dog 14B to permit the pin 49 to lift dog 14B upwardly in an unloaded condition. It will be apparent that the partially inclined bearing surface 46 moves backward over the sleeve 47 as the dog 14A assumes a horizontal position, thus controlling the descent of the spur into engagement with the pallet as the dogs enter the lower flight of the chain path substantially parallel with and closely adjacent the pallet stream.

In order to ensure that each dog falls into its correct position as it moves downwardly towards the pallets, downwardly spring loaded jockey rollers 55 are provided to enage the inclined camming face 53 of each dog and urge it into its lowermost position of driving engagement with its respective pallet if, for any reason, it is reluctant to adopt this position of its own volition. The rollers 55 are mounted on the distal ends of levers 56 which are rotatably mounted on pins 57 and biased at 58 into a lowermost position as shown in FIG. 1.

As the dogs apply substantial force to the pallets, there is a tendency for the rear portion of the dogs to lift. This lifting force is resisted by the outer races of the bearings 45 which bear against the downwardly directed surface of contoured bearing plates 59. The bearing plates 59 are supported by the idler shaft 21 and a pin 60 which is secured to the housing side walls and extends therebetween in a direction parallel to the shaft 21 through slotted holes 61 in each plate 59. Any tendency for the pallets themselves to lift is resisted by guide blocks 62.

Although the invention has been described with reference to a specific example, it will be appreciated by those skilled in the art that the invention may be embodied in many other forms and applied to the movement of many other articles without departing from the scope of the inventive concept. The claims defining the invention are as follows.

We claim:

1. Article translation apparatus for moving a series of substantially identical articles contiguously supplied thereto, each having a rearwardly directed abutment face thereon, said apparatus comprising at least one endless conveyor loop having a series of article driving dogs equally spaced therearound, each dog having a downwardly extending driving spur adapted drivingly to engage said abutment face and further including a slot at its leading end, each dog being rotatably mounted at its trailing end to said conveyor loop, said loop having equally spaced stop means extending into each slot to set upper and lower limits to the permitted rotation of each dog, means for driving said conveyor loop, said loop being positioned above said articles with a lower flight substantially parallel with the direction of travel of said articles, the pitch of adjacent pairs of said dogs along said lower flight being slightly less than the pitch of said abutment faces such that as each lagging dog descends into a substantially horizontal position of driving engagement with the abutment face of one article, defined by said lower limit of rotation, the abutment face of the adjacent leading article is moved out of driving engagement with the adjacent leading dog.

2. Article translation apparatus as claimed in claim 1 wherein said slot includes an inclined bearing surface which bears against said stop means to permit the gradual descent of said spur into said position of driving engagement.

3. Article translation apparatus as claimed in claim 1 or claim 2 wherein said conveyor loop comprises a pair of endless chains respectively disposed in adjacent parallel planes, said dogs being located between said pair of chains.

4. Article translation apparatus as claimed in claim 3 wherein each said dog is rotatably mounted to said chains by a hinge pin extending transversely between said chains from one to the other.

5. Article translation apparatus as claimed in claim 4 wherein said stop means includes a support pin extending transversely between said chains from one to the other.

6. Article translation apparatus as claimed in claim 1 including an arcuately faced bearing plate adapted to engage an upper portion of the trailing end of each dog when in said position of driving engagement thereby to prevent said trailing end from lifting upon the application of driving force.

7. Article translation apparatus as claimed in claim 1 wherein resiliently biased camming means are provided to urge said dogs into said position of driving engagement.

8. Article translation apparatus as claimed in claim 1 wherein said spur is located at said leading end beneath said slot.

9. Article translation apparatus as claimed in claim 1 wherein two said loops are provided.

* * * * *